(12) United States Patent
Kim

(10) Patent No.: US 10,309,273 B2
(45) Date of Patent: Jun. 4, 2019

(54) VARIABLE VALVE DURATION/VARIABLE VALVE LIFT SYSTEM AND ENGINE PROVIDED WITH THE SAME

(71) Applicants: Hyundai Motor Company, Seoul (KR); Kia Motors Corporation, Seoul (KR)

(72) Inventor: Kyung Mo Kim, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 176 days.

(21) Appl. No.: 15/266,912

(22) Filed: Sep. 15, 2016

(65) Prior Publication Data
US 2017/0107871 A1 Apr. 20, 2017

(30) Foreign Application Priority Data

Oct. 16, 2015 (KR) .................. 10-2015-0144975

(51) Int. Cl.

| F01L 1/18  | (2006.01) |
|---|---|
| F01L 13/00 | (2006.01) |
| F01L 1/053 | (2006.01) |
| F01L 1/26  | (2006.01) |
| F01L 1/46  | (2006.01) |
| F02D 13/02 | (2006.01) |

(52) U.S. Cl.
CPC .......... *F01L 13/0021* (2013.01); *F01L 1/053* (2013.01); *F01L 1/181* (2013.01); *F01L 1/267* (2013.01); *F01L 1/46* (2013.01); *F02D 13/0207* (2013.01); *F01L 2001/0535* (2013.01); *F01L 2001/467* (2013.01); *F01L 2013/10* (2013.01); *Y02T 10/18* (2013.01)

(58) Field of Classification Search
CPC ....... F01L 13/0021; F01L 1/053; F01L 1/181; F01L 1/267; F01L 2013/10
USPC ................................ 123/90.16, 90.39, 90.44
See application file for complete search history.

(56) References Cited

U.S. PATENT DOCUMENTS 9,574,467 B2 * 2/2017 Ha ...................... F01L 13/0015
123/90.16
9,964,007 B2 * 5/2018 Kim .................... F01L 13/0015
123/90.16

FOREIGN PATENT DOCUMENTS

JP 2009-236010 A 10/2009
JP 2015-117692 A 6/2015

* cited by examiner

*Primary Examiner* — Ching Chang
(74) *Attorney, Agent, or Firm* — Morgan, Lewis & Bockius LLP

(57) ABSTRACT

A variable valve duration/variable valve lift system may include a camshaft, a first cam portion including a first cam, into which the camshaft is inserted and of which a relative phase angle of the first cam with respect to the camshaft is variable, an inner bracket transmitting rotation of the camshaft to the first cam portion, a slider housing into which the inner bracket is rotatably inserted, a first rocker arm having a first end contacting the first cam, a rocker shaft to which the first rocker arm is rotatably connected, a solenoid valve configured to selectively supply hydraulic pressure, a position controller configured to selectively change a position of the slider housing, a first bridge connected to a second end of the first rocker arm and to which a first valve is connected, and a valve lift disposed within the first bridge.

21 Claims, 12 Drawing Sheets

VARIABLE VALVE DURATION/VARIABLE VALVE LIFT SYSTEM AND ENGINE PROVIDED WITH THE SAME

CROSS-REFERENCE TO RELATED APPLICATION

The present application claims priority to Korean Patent Application No. 10-2015-0144975, filed Oct. 16, 2015, the entire contents of which is incorporated herein for all purposes by this reference.

NAMES OF THE PARTIES TO A JOINT RESEARCH AGREEMENT

Hyundai Motor Company and Kia Motors Corporation were parties to a joint research agreement prior to the effective filing date of the instant application.

BACKGROUND OF THE INVENTION

Field of the Invention

The present invention relates to a variable valve duration/variable valve lift system and an engine provided with the same. More particularly, various embodiments of the present invention relate to a variable valve duration/variable valve lift system and an engine provided with the same which may vary opening duration and lift of a valve according to operation conditions of an engine with a simple construction.

Description of Related Art

An internal combustion engine generates power by burning fuel in a combustion chamber in an air media drawn into the chamber. Intake valves are operated by a camshaft in order to intake the air, and the air is drawn into the combustion chamber while the intake valves are open. In addition, exhaust valves are operated by the camshaft, and a combustion gas is exhausted from the combustion chamber while the exhaust valves are open.

Optimal operation of the intake valves and the exhaust valves depends on a rotation speed of the engine. That is, an optimal lift or optimal opening/closing timing of the valves depends on the rotation speed of the engine. In order to achieve such optimal valve operation depending on the rotation speed of the engine, various research, such as designing of a plurality of cams and a continuous variable valve lift (CVVL) that can change valve lift according to engine speed, has been undertaken.

Also, in order to achieve such an optimal valve operation depending on the rotation speed of the engine, research has been undertaken on a continuously variable valve timing (CVVT) apparatus that enables different valve timing operations depending on the engine speed. The general CVVT may change valve timing with a fixed valve opening duration.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a variable valve duration/variable valve lift system and an engine provided with the same which may vary opening duration and lift of a valve according to operation conditions of an engine, with a simple construction.

A variable valve duration/variable valve lift system according to various aspects of the present invention may be applied to an SOHC engine so as to reduce weight of the engine and driving resistance.

According to various aspects of the present invention, a variable valve duration/variable valve lift system may include a camshaft, a first cam portion including a first cam, into which the camshaft is inserted and of which a relative phase angle of the first cam with respect to the camshaft is variable, an inner bracket transmitting rotation of the camshaft to the first cam portion, a slider housing into which the inner bracket is rotatably inserted, a first rocker arm having a first end contacting the first cam, a rocker shaft to which the first rocker arm is rotatably connected, a solenoid valve configured to selectively supply hydraulic pressure, a position controller configured to selectively change a position of the slider housing according to the selective supplying of the hydraulic pressure from the solenoid valve, a first bridge connected to a second end of the first rocker arm and to which a first valve is connected, and a valve lift disposed within the first bridge for changing valve lift of the first valve according to supplying of the hydraulic pressure from the solenoid valve.

A control hydraulic line may be formed on the rocker shaft, and the solenoid valve and the position controller may be communicated with the control hydraulic line.

The position controller may include a controller housing on which a master valve hole is formed, and a master valve inserted into the master valve hole and moved according to the supplying of the hydraulic pressure from the solenoid valve to change a relative position of the slider housing with respect to the camshaft.

A lock pin hole may be formed on the controller housing, and the position controller may include a lock pin disposed within the lock pin hole and selectively connectable to the master valve according to the supplying of the hydraulic pressure from the solenoid valve, and a return spring disposed within the lock pin hole and elastically supporting the lock pin.

A valve groove into which the lock pin is selectively inserted may be formed on the master valve.

The controller housing may be mounted to support the rocker shaft.

The valve lift may include a screw on which a screw oil hole connected to the first rocker arm is formed, a plunger slidable within the first bridge and on which a plunger oil hole communicated with the screw oil hole is formed, a plunger lock pin slidable within the first bridge and selectively connectable to the plunger according to supplying of hydraulic pressure from the plunger oil hole, a plunger return spring disposed within the first bridge and pushing against the plunger lock pin for the plunger lock pin to be connected to the plunger, a lost motion spring disposed within the first bridge and elastically supporting the plunger, and a swivel foot connecting the plunger with the screw.

A first slot and a second slot may be formed on the inner bracket, and the first cam portion may include a wheel on which a wheel key is formed and connected to the first cam, and the variable valve duration/variable valve lift system may further include a connecting pin connected to the camshaft, a first slider pin on which a pin slot, where the wheel key is slidably inserted thereto along a length direction of the wheel key, may be formed, the first slider pin being rotatably inserted into the first slot, and a second slider pin on which a pin hole, where the connecting pin is slidably inserted thereto along a length direction of the connecting pin, may be formed, the second slider pin being rotatably inserted into the second slot.

The variable valve duration/variable valve lift system may further include a bearing disposed between the slider housing and the inner bracket.

The variable valve duration/variable valve lift system may further include a first roller connected to a first end of the first rocker arm and contacting the first cam, and a first bridge connected to a second end of the first rocker arm, in which two first valves may be connected to the first bridge.

The variable valve duration/variable valve lift system may further include an outer shaft on which a guide slot is formed, and to which the camshaft is inserted, and wherein the first cam may be connected to the outer shaft.

The variable valve duration/variable valve lift system may further include a second cam portion including a second cam connected to the camshaft through the guide slot, and a second rocker arm rotatably connected to the rocker shaft, a first end of which contacts the second cam and a second end of which is connected with a second valve.

The variable valve duration/variable valve lift system may further include a second roller connected to the first end of the second rocker arm and contacting the second cam, and a second bridge connected to the second end of the second rocker arm, and two second valves may be connected to the second bridge.

According to various aspects of the present invention, an engine may include a camshaft, a first cam portion including a first cam, into which the camshaft is inserted, and of which a relative phase angle of the first cam with respect to the camshaft is variable, an inner bracket transmitting rotation of the camshaft to the first cam portion, a slider housing in which the inner bracket is rotatably inserted, a first rocker arm including a first end contacting the first cam, a rocker shaft to which the first rocker arm is rotatably connected, a solenoid valve configured to selectively supply hydraulic pressure, a position controller configured to selectively change a position of the slider housing according to the supplying of the hydraulic pressure from the solenoid valve, a first bridge connected to a second end of the first rocker arm and to which a first valve is connected, and a valve lift disposed within the first bridge to change valve lift of the first valve according to the supplying of the hydraulic pressure from the solenoid valve.

A control hydraulic line may be formed on the rocker shaft, and the solenoid valve and the position controller may be communicated with the control hydraulic line, and the position controller may include a controller housing on which a master valve hole is formed, and a master valve inserted into the master valve hole and moved according to the supplying of the hydraulic pressure from the solenoid valve to change a relative position of the slider housing with respect to the camshaft.

A lock pin hole may be formed on the controller housing, and a valve groove into which the lock pin may be selectively inserted may be formed on the master valve, and the position controller may include a lock pin disposed within the lock pin hole and selectively connectable to the master valve according to the supplying of the hydraulic pressure from the solenoid valve, and a return spring disposed within the lock pin hole and elastically supporting the lock pin.

A first slot and a second slot may be formed on the inner bracket, and the first cam portion may include a wheel on which a wheel key is formed and connected to the first cam, and the engine may further include a connecting pin connected to the camshaft, a first slider pin on which a pin slot, where the wheel key is slidably inserted thereto along a length direction of the wheel key, is formed, the first slider pin being rotatably inserted into the first slot, and a second slider pin on which a pin hole, where the connecting pin is slidably inserted thereto along a length direction of the connecting pin, is formed, the second slider pin being rotatably inserted into the second slot.

The engine may further include an outer shaft on which a guide slot is formed and to which the camshaft is inserted, and wherein the first cam may be connected to the outer shaft.

The engine may further include a second cam portion including a second cam rotating with the same phase angle of the camshaft, and a second rocker arm rotatably connected to the rocker shaft, a first end of which may contact the second cam and a second end of which may be connected with a second valve.

The engine may further include an upper bracket connecting the camshaft to a cylinder head, in which a stopper for limiting movement of the slider housing may be formed on the upper bracket.

As described above, a variable valve duration/variable valve lift system according to various embodiments of the present invention may vary an opening duration of a valve as well as valve lift simultaneously according to operation conditions of an engine, with a simple construction.

The variable valve duration/variable valve lift system according to various embodiments of the present invention may be reduced in size and thus the entire height of a valve train may be reduced.

Since the variable valve duration/variable valve lift system may be applied to an existing engine without excessive modification, productivity may be enhanced and production cost may be reduced.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
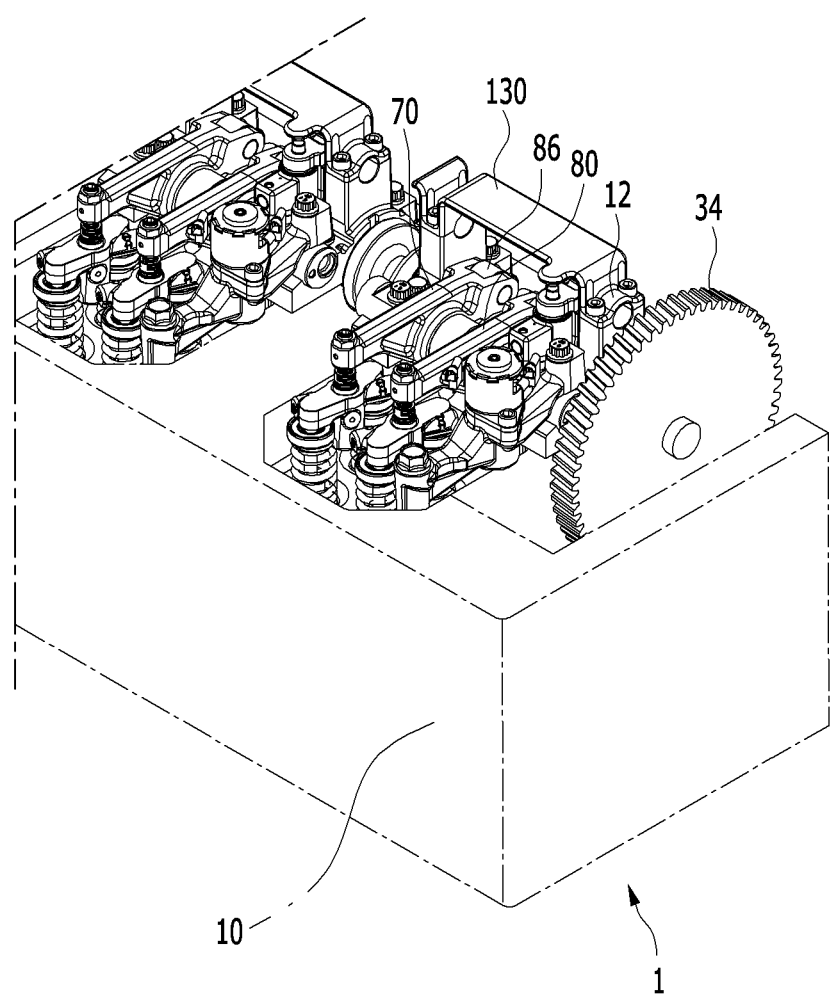
FIG. 1 is a perspective view of an engine provided with an exemplary variable valve duration/variable valve lift system according to various embodiments of the present invention.
Figure 2:
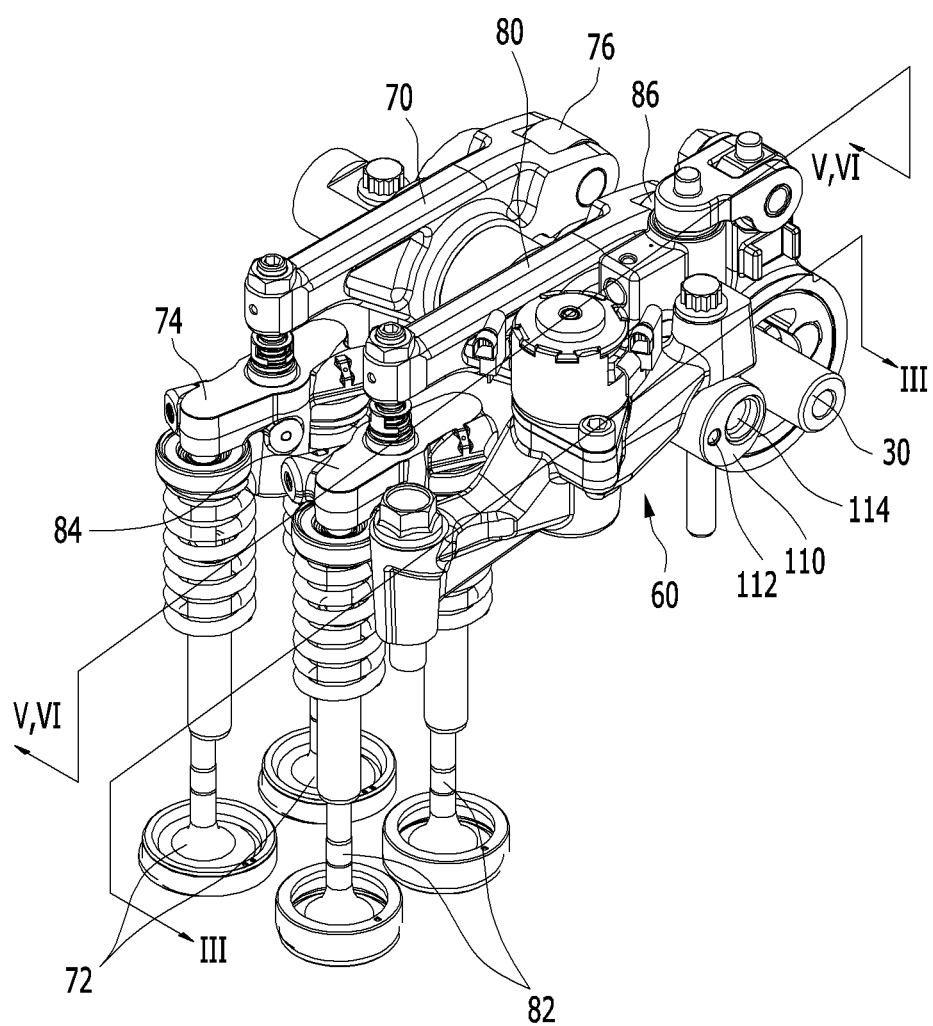
FIG. 2 is a perspective view of an exemplary variable valve duration/variable valve lift system according to various embodiments of the present invention.

FIG. 1 is a perspective view of an engine provided with an exemplary variable valve duration/variable valve lift system according to various embodiments of the present invention and FIG. 2 is a perspective view of an exemplary variable valve duration/variable valve lift system according to various embodiments of the present invention.

Figure 3:
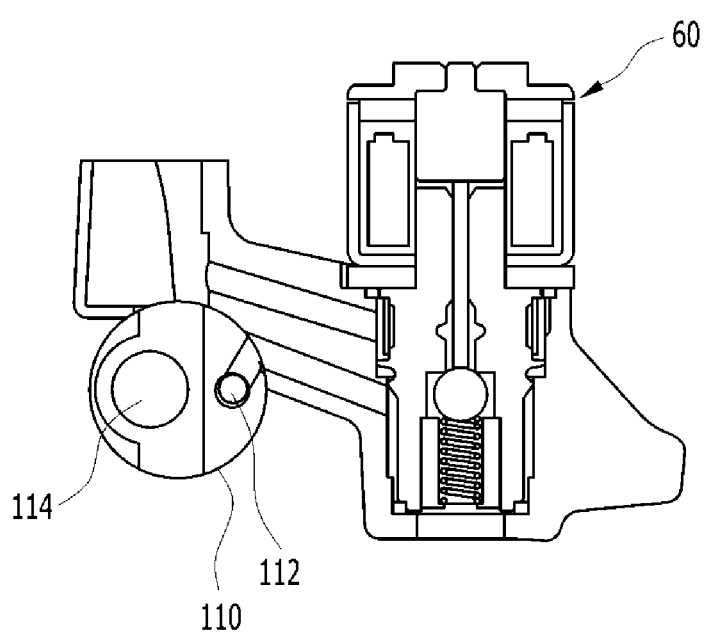
FIG. 3 is a cross-sectional view along line of FIG. 2.
Figure 4:
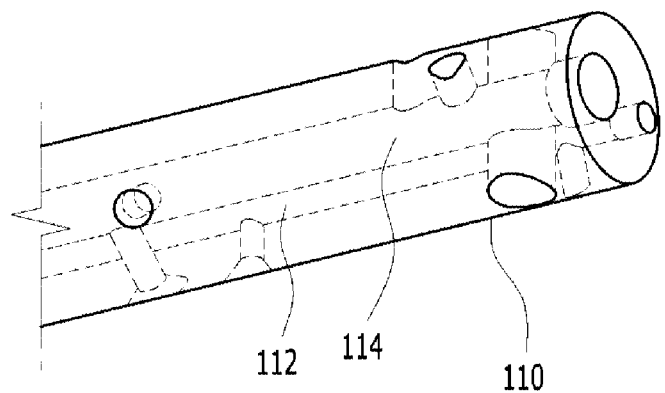
FIG. 4 is a drawing showing a rocker shaft of an exemplary variable valve duration/variable valve lift system according to various embodiments of the present invention.

FIG. 3 is a cross-sectional view along line III-III of FIG. 2 and FIG. 4 is a drawing showing a rocker shaft of an exemplary variable valve duration/variable valve lift system according to various embodiments of the present invention.

Figure 5:
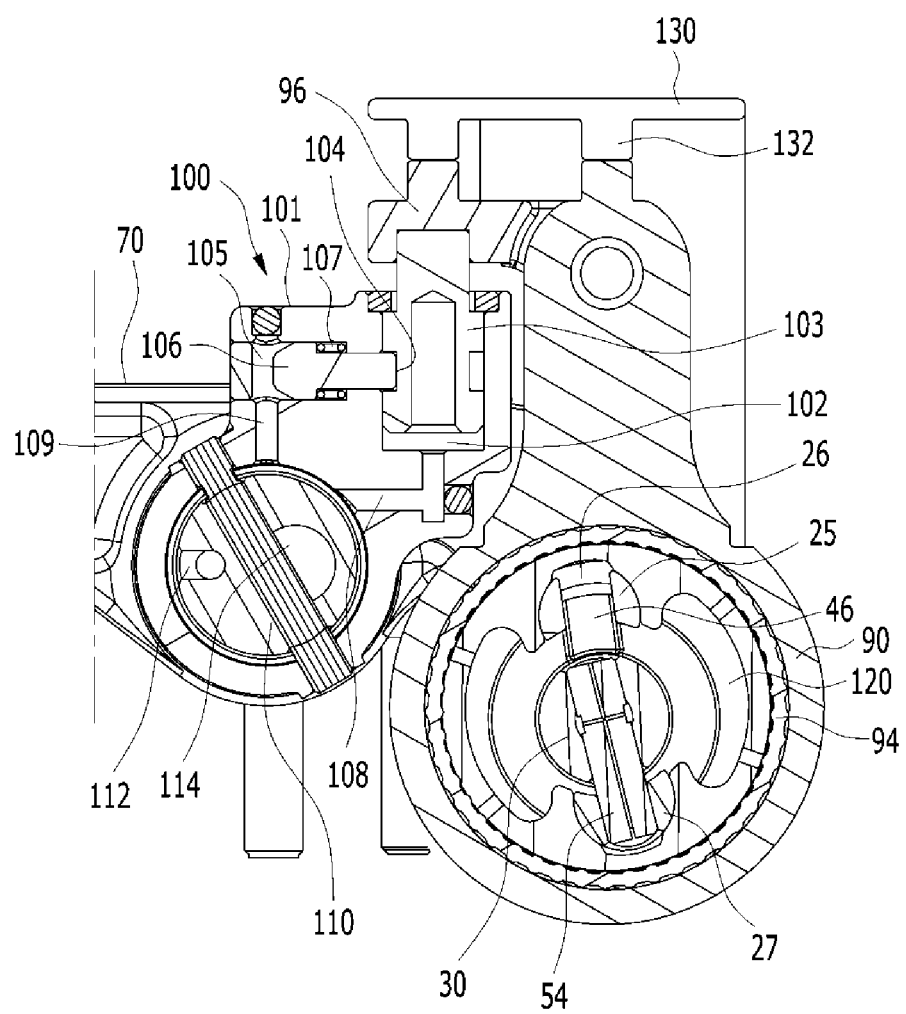
FIG. 5 is a cross-sectional view along line V-V of FIG. 2.
Figure 6:
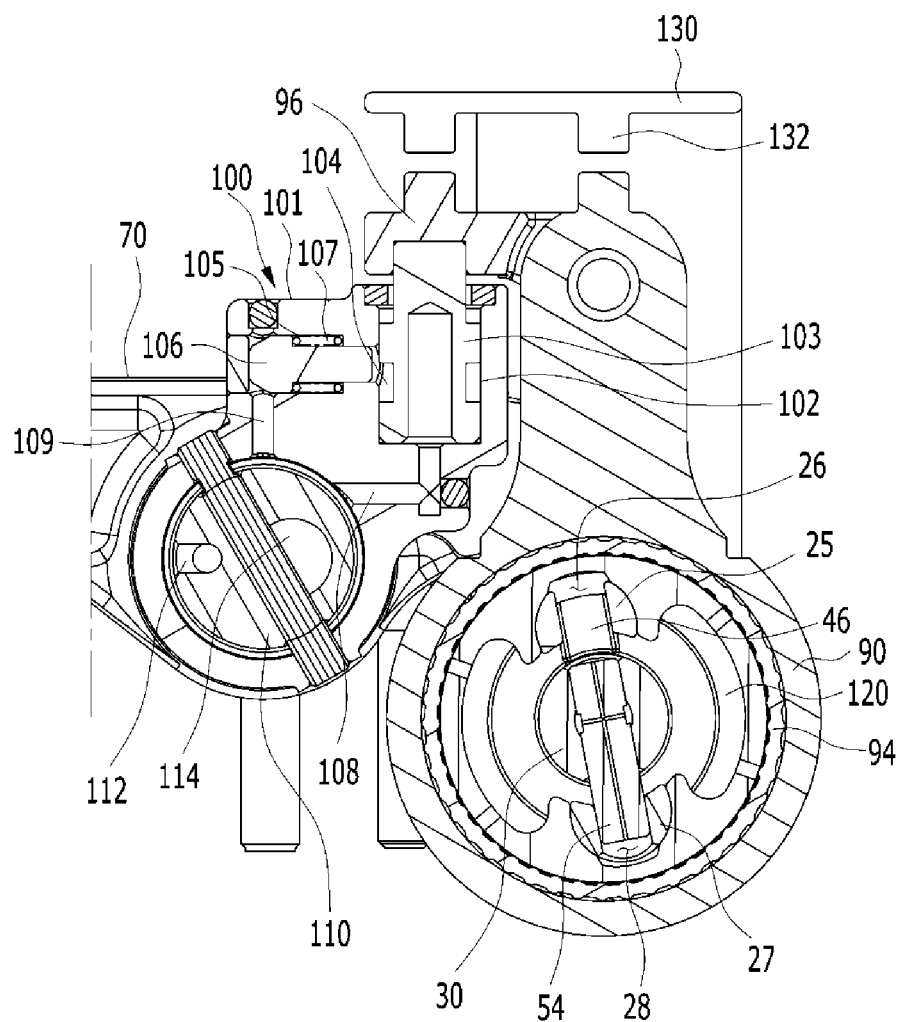
FIG. 6 is a cross-sectional view along line VI-VI of FIG. 2.

FIG. 5 is a cross-sectional view along line V-V of FIG. 2 and FIG. 6 is a cross-sectional view along line VI-VI of FIG. 2.

Figure 7:
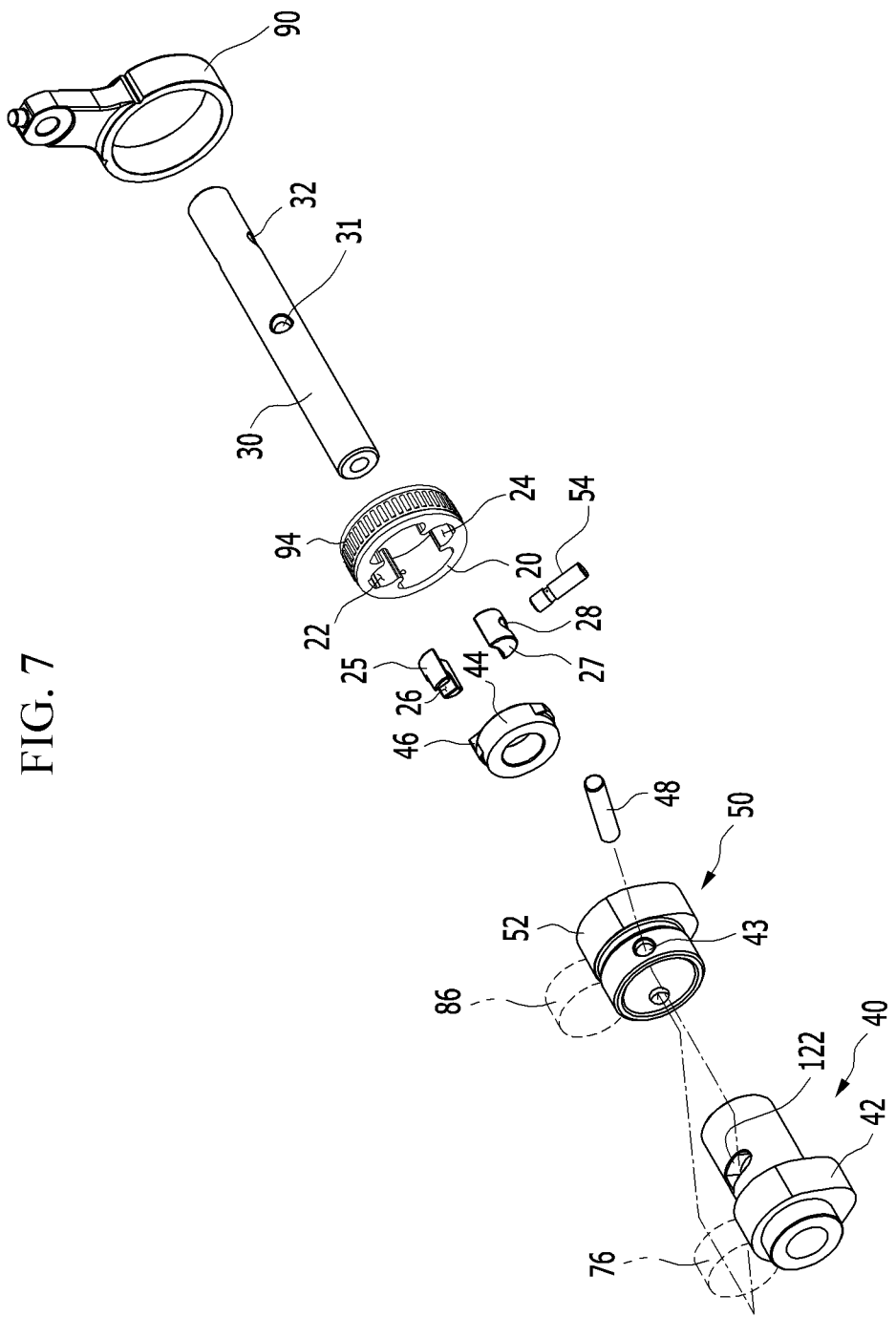
FIG. 7 is a partial perspective view of the exemplary variable valve duration/variable valve lift system according to various embodiments of the present invention.
Figure 8:
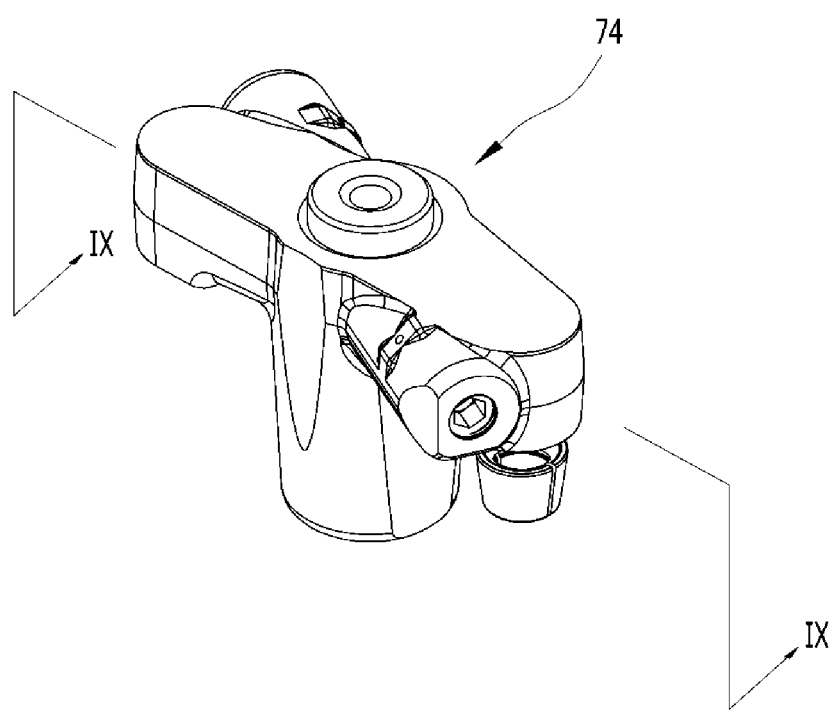
FIG. 8 is a perspective view of a first bridge of the exemplary variable valve duration/variable valve lift system according to various embodiments of the present invention.

FIG. 7 is a partial perspective view of the exemplary variable valve duration/variable valve lift system according to various embodiments of the present invention and FIG. 8 is a perspective view of a first bridge of the exemplary variable valve duration/variable valve lift system according to various embodiments of the present invention.

Figure 9:
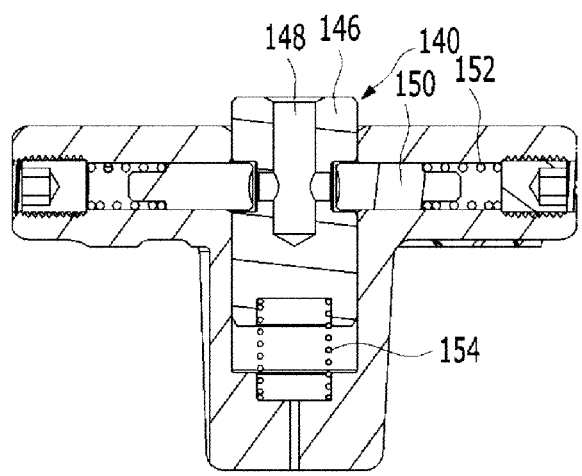
FIG. 9 is a cross-sectional view along line IX-IX of FIG. 8.
Figure 10A:
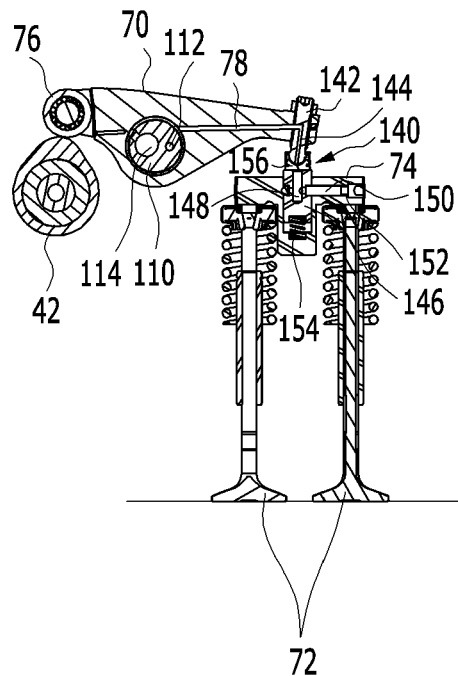
FIG. 10A and FIG. 10B are drawings showing a valve lift device of the exemplary variable valve duration/variable valve lift system according to various embodiments of the present invention.
Figure 10B:
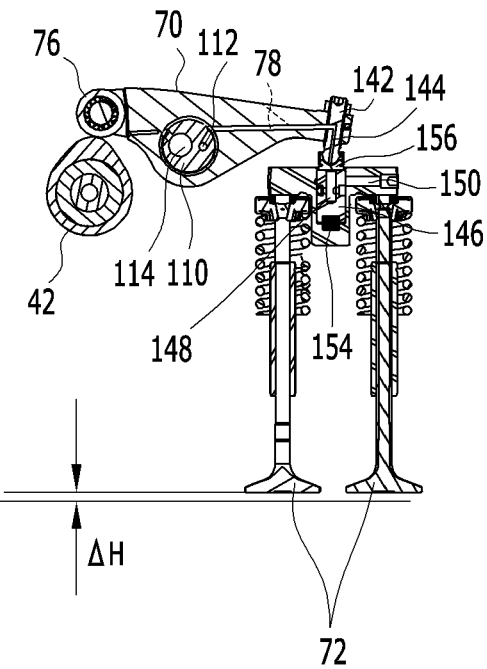

FIG. 9 is a cross-sectional view along line IX-IX of FIG. 8 and FIGS. 10A and 10B are drawings showing a valve lift of the exemplary variable valve duration/variable valve lift system according to various embodiments of the present invention.

Referring to FIG. 1 to FIG. 10B, an engine 10 according to various embodiments of the present invention includes a cylinder head 10 and a variable valve duration/variable valve lift system mounted to the cylinder head 10 through a cam cap 12.

The variable valve duration/variable valve lift system may include a camshaft 30, a first cam portion 40 including a first cam 42, into which the camshaft 30 is inserted and of which a relative phase angle of the first cam 42 with respect to the camshaft 30 is variable, an inner bracket 20 transmitting rotation of the camshaft 30 to the first cam portion 40, a slider housing 90 in which the inner bracket 20 is rotatably inserted, a first rocker arm 70 of which a first end contacts the first cam 42, a rocker shaft 110 to which the first rocker arm 70 is rotatably connected, a solenoid valve 60 configured to selectively supply hydraulic pressure, a position controller 100 configured to selectively change a position of the slider housing 90 according to supplying of the hydraulic pressure from the solenoid valve 60, a first bridge 74 connected to a second end of the first rocker arm 70 and to which a first valve 72 is connected and a valve lift 140 disposed within the first bridge 74 for changing valve lift of the first valve 72 according to supplying of the hydraulic pressure from the solenoid valve 60.

In the detailed description and claims, the cylinder head 10 may include a cam carrier.

The camshaft 30 is connected with a cam sprocket 34 and rotated by the cam sprocket 34.

A control hydraulic line 112 is formed on the rocker shaft 110 and the solenoid valve 60 and the position controller 100 are communicated with the control hydraulic line. Also, a lubrication hydraulic line 114 for supplying lubricant is formed on the rocker shaft 110.

The position controller 100 includes a controller housing 101 on which a master valve hole 102 is formed and a master valve 103 inserted into the master valve hole 102 and moved according to supplying hydraulic pressure from the solenoid valve 60 so as to change a relative position of the slider housing 90 with respect to the camshaft 30.

The master valve 103 and the slider housing 90 may be connected through a connecting bracket 96.

A lock pin hole 105 is formed on the controller housing 101 and the position controller 100 include a lock pin 106 disposed within the lock pin hole 105 and selectively connectable to the master valve 103 according to supplying hydraulic pressure from the solenoid valve 60 and a return spring 107 disposed within the lock pin hole 105 and elastically supporting the lock pin 106.

A valve groove 104 where the lock pin 106 is selectively inserted into is formed on the master valve 103.

A master valve hydraulic line 108 and a lock pin hydraulic line 109 are formed on the controller housing 101 communicated with the valve hole 102 and the lock pin hole 106 respectively.

The rocker shaft 110 is inserted into the controller housing 101 and the controller housing 101 supports and mounts the rocker shaft 110 to the cylinder head 10.

In various exemplary embodiments, the engine 1 further includes an upper bracket 130 connecting the camshaft 30 to the cylinder head 10 together with the cam cap 12 and a stopper 132 for limiting movement of the slider housing 90 is formed on the upper bracket 130.

A first slot 22 and a second slot 24 are formed on the inner bracket 20.

The first cam portion 40 includes a wheel 44 on which a wheel key 46 is formed and connected to the first cam 42.

A camshaft hole 32 is formed on the camshaft 30 and a connection pin 54 is connected to the cam shaft 30 through the camshaft hole 32.

A first slider pin 25, on which a pin slot 26 where the wheel key 46 is slidably inserted thereto along a length direction of the wheel key 46 is formed, is rotatably inserted into the first slot 22. And a second slider pin 27, on which a pin hole 28 where the connecting pin 54 is slidably inserted thereto along a length direction of the connecting pin, is formed and is rotatably inserted into the second slot 24.

A bearing 94 is disposed between the slider housing 90 and the inner bracket 20. Thus, rotation of the inner bracket 20 may be easily performed.

The variable valve duration/variable valve lift system according to various embodiments of the present invention further includes a second cam portion 50 including a second cam 52 rotating with the same phase angle of the camshaft 30 and a second rocker arm 80 rotatably connected to the rocker shaft 110, of which an end contacts with the second cam 52 and of which the other end is connected with a second valve 82.

The camshaft 30 may be inserted into an outer shaft 120 where a guide slot 122 may be formed along a circumference direction thereof, and the first wheel 44 is connected to the outer shaft 120.

The first cam 42 is connected to and rotated with the outer shaft 120.

A cam pin 48 may be connected to the second cam 52 and the cam pin 48 is inserted into the guide slot 122 for guiding rotation of the second cam 52. A cam hole 43 may be formed to the second cam 52, the cam pin 48 is inserted into the cam hole 43 and a connecting hole 31 formed to the camshaft 30 and the cam pin 48 may be movably inserted into the guide slot 122. Thus the second cam 52 may relatively rotate with respect to the outer shaft 120 along a circumference direction of the outer shaft 120.

A first roller 76 contacting the first cam 42 is connected to a first end of the first rocker arm 70 and a first bridge 74 is connected to a second end of the first rocker arm 70.

Two first valves 72 may be connected to the first bridge 74.

A second roller 86 contacting the second cam 52 is connected to a first end of the second rocker arm 80 and a second bridge 84 is connected to a second end of the second rocker arm 80.

Two second valves 82 may be connected to the second bridge 80.

Referring to FIG. 8 to FIG. 10B, the valve lift 140 includes a screw 142 on which a screw oil hole 144 connected to the first rocker arm 70 is formed, a plunger 146 slidable within the first bridge 74 and on which a plunger oil hole 148 communicated with the screw oil hole 144 is formed, a plunger lock pin 150 slidable within the first bridge 74 and selectively connectable to the plunger 146 according to supplying hydraulic pressure from the plunger oil hole 148, a plunger return spring 152 disposed within the first bridge 74 and pushing the plunger lock pin 150 for the plunger lock pin 150 to be connected to the plunger 146, a lost motion spring 154 disposed within the first bridge 74 and elastically supporting the plunger 146 and a swivel foot 156 connecting the plunger 146 with the screw 142.

The plunger lock pin 150 may be disposed vertical to the plunger 146.

A rocker arm control hydraulic line 78 is formed on the first rocker arm 70 and hydraulic pressure selectively supplied from the solenoid valve 60 is supplied to the plunger lock pin 150 through the rocker arm control hydraulic line 78.

The variable valve duration/variable valve lift system according to various embodiments of the present invention may be applied to a SOHC engine with light weight and with little driving resistance.

Figure 11:
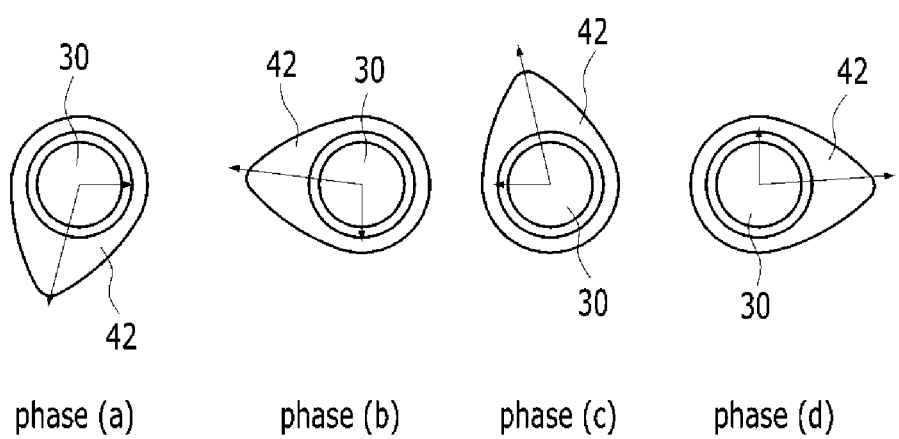
FIG. 11 is a drawing showing mechanical motions of cams of the exemplary variable valve duration/variable valve lift system according to various embodiments of the present invention.

FIG. 11 is a drawing showing mechanical motions of cams of the exemplary variable valve duration/variable valve lift system according to various embodiments of the present invention.

Referring to FIG. 1 to FIG. 11, an operation of the variable valve duration/variable valve lift system will be described.

As shown in FIG. 5, when hydraulic pressure supply is not supplied from the solenoid valve 60, rotation centers of the camshaft 30 and the inner bracket 20 are coincident and the first cam 42 rotates with the same phase angle of the camshaft 30. That is, the first cam 42 and the camshaft 30 rotate with the same speed.

As shown in FIG. 10A, the plunger lock pin 150 is connected to the plunger 146 due to the plunger return spring 152.

When an electric control unit (ECU) outputs control signal to the solenoid valve 60, hydraulic pressure from the solenoid valve 60 is supplied to the master valve 103 through the control hydraulic line 112 and then the master valve 103 moves together with the slider housing 90.

That is, as shown in FIG. 6, the slider housing 90 moves upward and the rotations centers of the inner bracket 20 and the camshaft 30 are not coincident.

Then the rotation speed of the first cam 42 with respect to the rotation speed of the camshaft 30 is changed.

While the connecting pin 54 is rotated together with the camshaft 30, the connecting pin 54 is movable within the pin hole 28, the second slider pin 27 and the first slider pin 25 are rotatable within the second slot 24 and the first slot 22 respectively and the wheel key 46 is movable within the pin slot 26. Thus when the rotation centers of the camshaft 30 and the inner bracket 20 are not coincident, the rotation speed of the first cam 42 with respect to the rotation speed of the camshaft 30 is changed.

As shown in FIG. 11, while the phase angle of the camshaft 30 is constantly changed when the relative rotation center of the inner bracket 20 with respect to the rotation center of the camshaft 30 is changed upward, the rotation speed of the first cam 42 is relatively slower than rotation speed of the camshaft 30 from phase a to phase b and from phase b to phase c, then the rotation speed of the first cam 42 is relatively faster than rotation speed of the camshaft 30 from phase c to phase d and from phase d to phase a.

According to the relative position of the inner bracket 20, timing of the first cam 42 to push the first roller 76 that is the timing of the first valve 72 is opened or closed is changed.

Also, simultaneously as shown in FIG. 10B, the hydraulic pressure from the solenoid valve 60 is supplied to the plunger lock pin 150 through the rocker arm control hydraulic line 78, the screw oil hole 144 and the plunger oil hole 148. Then, the plunger lock pin 150 is disconnected from the plunger 146 and the plunger 146 does lost motion at ΔH.

Figure 12:
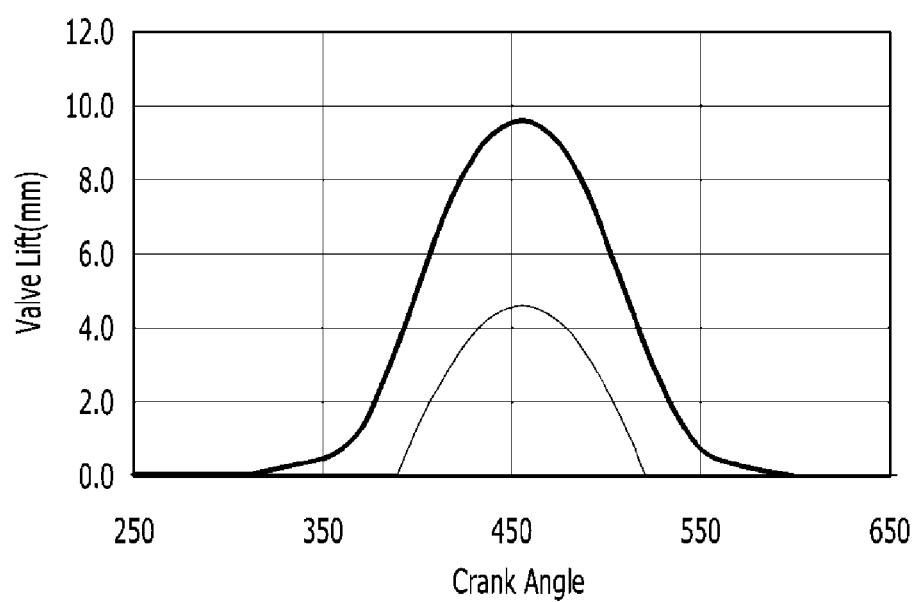
FIG. 12 is a graph of a valve profile of the exemplary variable valve duration/variable valve lift system according to various embodiments of the present invention.

FIG. 12 is a graph of a valve profile of the exemplary variable valve duration/variable valve lift system according to various embodiments of the present invention.

The variable valve duration/variable valve lift system according to various exemplary embodiments of the present invention may vary an opening duration of the valves as well as valve lift simultaneously according to operation conditions of an engine.

Thus, when operation condition is changed from a normal operation condition requiring high power to an operation condition requiring low speed and/or low load, the hydraulic pressure from the solenoid valve 60 is supplied the master valve 103 and the plunger lock pin 150 simultaneously and the valve lift is reduced and the valve duration is increased. Thus, even in the low speed and low load condition supplying air or air/fuel mixture may be sufficient.

Although it is not shown in drawings, vale closing/opening timing of the first valve 72 may be advanced or retarded by adjusting contacting positions of the first roller 76 and the first cam 42.

During controlling the valve duration and lift of the first valve 72, the duration and lift of the second valve 82 may be maintained constantly.

As described above, the variable valve duration/variable valve lift system according to various embodiments of the present invention may vary an opening duration of a valve as well as valve lift simultaneously according to operation conditions of an engine, with a simple construction.

The variable valve duration/variable valve lift system according to various embodiments of the present invention may be reduced in size and thus the entire height of a valve train may be reduced.

Since the variable valve duration/variable valve lift system may be applied to an existing engine without excessive modification, thus productivity may be enhance and production cost may be reduced.

For convenience in explanation and accurate definition in the appended claims, the terms "upper" or "lower", "inner" or "outer" and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A variable valve duration/variable valve lift system, comprising:
    a camshaft;
    a first cam portion including a first cam, into which the camshaft is inserted and of which a relative phase angle of the first cam with respect to the camshaft is variable;
    an inner bracket transmitting rotation of the camshaft to the first cam portion;
    a slider housing into which the inner bracket is rotatably inserted;
    a first rocker arm having a first end contacting the first cam;
    a rocker shaft to which the first rocker arm is rotatably connected;
    a solenoid valve configured to selectively supply hydraulic pressure;
    a position controller configured to selectively change a position of the slider housing according to the selective supplying of the hydraulic pressure supplied from the solenoid valve;
    a first bridge connected to a second end of the first rocker arm and to which a first valve is connected; and
    a valve lift disposed within the first bridge for changing valve lift of the first valve according to supplying of the hydraulic pressure supplied from the solenoid valve.

2. The variable valve duration/variable valve lift system of claim 1,
    wherein a control hydraulic line is formed on the rocker shaft; and
    wherein the solenoid valve and the position controller are fluidically-communicated with the control hydraulic line.

3. The variable valve duration/variable valve lift system of claim 2, wherein the position controller comprises:
    a controller housing on which a master valve hole is formed; and
    a master valve inserted into the master valve hole and moved according to the supplying of the hydraulic pressure from the solenoid valve to change a relative position of the slider housing with respect to the camshaft.

4. The variable valve duration/variable valve lift system of claim 3, wherein a lock pin hole is formed on the controller housing, and the position controller comprises:
    a lock pin disposed within the lock pin hole and selectively connectable to the master valve according to the supplying of the hydraulic pressure from the solenoid valve; and
    a return spring disposed within the lock pin hole and elastically supporting the lock pin.

5. The variable valve duration/variable valve lift system of claim 4, wherein a valve groove into which the lock pin is selectively inserted is formed on the master valve.

6. The variable valve duration/variable valve lift system of claim 3, wherein the controller housing is mounted to support the rocker shaft.

7. The variable valve duration/variable valve lift system of claim 1, wherein the valve lift comprises:
    a screw on which a screw oil hole connected to the first rocker arm is formed;
    a plunger slidable within the first bridge and on which a plunger oil hole communicated with the screw oil hole is formed;
    a plunger lock pin slidable within the first bridge and selectively connectable to the plunger according to supplying of hydraulic pressure from the plunger oil hole;
    a plunger return spring disposed within the first bridge and pushing against the plunger lock pin for the plunger lock pin to be connected to the plunger;
    a lost motion spring disposed within the first bridge and elastically supporting the plunger; and
    a swivel foot connecting the plunger with the screw.

8. The variable valve duration/variable valve lift system of claim 1,
    wherein a first slot and a second slot are formed on the inner bracket, and the first cam portion comprises a wheel on which a wheel key is formed and connected to the first cam, and wherein the variable valve duration/variable valve lift system further comprises:
    a connecting pin connected to the camshaft;
    a first slider pin on which a pin slot, where the wheel key is slidably inserted thereto along a length direction of the wheel key, is formed, the first slider pin being rotatably inserted into the first slot; and
    a second slider pin on which a pin hole, where the connecting pin is slidably inserted thereto along a length direction of the connecting pin, is formed, the second slider pin being rotatably inserted into the second slot.

9. The variable valve duration/variable valve lift system of claim 8, further comprising a bearing disposed between the slider housing and the inner bracket.

10. The variable valve duration/variable valve lift system of claim 8, further comprising:
    a first roller connected to a first end of the first rocker arm and contacting the first cam; and
    a first bridge connected to a second end of the first rocker arm,
    wherein two first valves are connected to the first bridge.

11. The variable valve duration/variable valve lift system of claim 8, further comprising an outer shaft on which a guide slot is formed, and to which the camshaft is inserted,
    wherein the first cam is connected to the outer shaft.

12. The variable valve duration/variable valve lift system of claim 8, further comprising:
    a second cam portion including a second cam connected to the camshaft through the guide slot; and
    a second rocker arm rotatably connected to the rocker shaft, a first end of which contacts the second cam and a second end of which is connected with a second valve.

13. The variable valve duration/variable valve lift system of claim 12, further comprising:
    a second roller connected to the first end of the second rocker arm and contacting the second cam; and
    a second bridge connected to the second end of the second rocker arm, and
    wherein two second valves are connected to the second bridge.

14. An engine comprising:
    a camshaft;
    a first cam portion including a first cam, into which the camshaft is inserted, and of which a relative phase angle of the first cam with respect to the camshaft is variable;
    an inner bracket transmitting rotation of the camshaft to the first cam portion;
    a slider housing in which the inner bracket is rotatably inserted;
    a first rocker arm including a first end contacting the first cam;
    a rocker shaft to which the first rocker arm is rotatably connected;
    a solenoid valve configured to selectively supply hydraulic pressure;
    a position controller configured to selectively change a position of the slider housing according to the supplying of the hydraulic pressure supplied from the solenoid valve;
    a first bridge connected to a second end of the first rocker arm and to which a first valve is connected; and
    a valve lift disposed within the first bridge to change valve lift of the first valve according to the supplying of the hydraulic pressure supplied from the solenoid valve.

15. The engine of claim 14, wherein the valve lift comprises:
    a screw on which a screw oil hole connected to the first rocker arm is formed;
    a plunger slidable within the first bridge and on which a plunger oil hole fluidically-communicated with the screw oil hole is formed;
    a plunger lock pin slidable within the first bridge and selectively connectable to the plunger according to supplying of hydraulic pressure from the plunger oil hole;
    a plunger return spring disposed within the first bridge and pushing against the plunger lock pin for the plunger lock pin to be connected to the plunger;
    a lost motion spring disposed within the first bridge and elastically supporting the plunger; and
    a swivel foot connecting the plunger with the screw.

16. The engine of claim 14,
    wherein a control hydraulic line is formed on the rocker shaft; and
    wherein the solenoid valve and the position controller are fluidically-communicated with the control hydraulic line, and
    wherein the position controller comprises:
        a controller housing on which a master valve hole is formed; and
        a master valve inserted into the master valve hole and moved according to the supplying of the hydraulic pressure from the solenoid valve to change a relative position of the slider housing with respect to the camshaft.

17. The engine of claim 16, wherein
    a lock pin hole is formed on the controller housing; and
    a valve groove into which the lock pin is selectively inserted is formed on the master valve, and
    wherein the position controller comprises:
        a lock pin disposed within the lock pin hole and selectively connectable to the master valve according to the supplying of the hydraulic pressure from the solenoid valve; and
        a return spring disposed within the lock pin hole and elastically supporting the lock pin.

18. The engine of claim 14, wherein
    a first slot and a second slot are formed on the inner bracket; and
    the first cam portion comprises a wheel on which a wheel key is formed and connected to the first cam, and
    wherein the engine further comprises:
        a connecting pin connected to the camshaft;
        a first slider pin on which a pin slot, where the wheel key is slidably inserted thereto along a length direction of the wheel key, is formed, the first slider pin being rotatably inserted into the first slot; and
        a second slider pin on which a pin hole, where the connecting pin is slidably inserted thereto along a length direction of the connecting pin, is formed, the second slider pin being rotatably inserted into the second slot.

19. The engine of claim 18, further comprising an outer shaft on which a guide slot is formed and to which the camshaft is inserted,
    wherein the first cam is connected to the outer shaft.

20. The engine of claim 19, further comprising:
    a second cam portion including a second cam connected to the camshaft through the guide slot; and a second rocker arm rotatably connected to the rocker shaft, a first end of which contacts the second cam and a second end of which is connected with a second valve.

21. The engine of claim 14, further comprising an upper bracket connecting the camshaft to a cylinder head,
wherein a stopper for limiting movement of the slider housing is formed on the upper bracket.

* * * * *